June 29, 1954  J. F. COCKERHAM  2,682,214
HARROW ATTACHMENT FOR TRACTORS
Filed Aug. 5, 1949
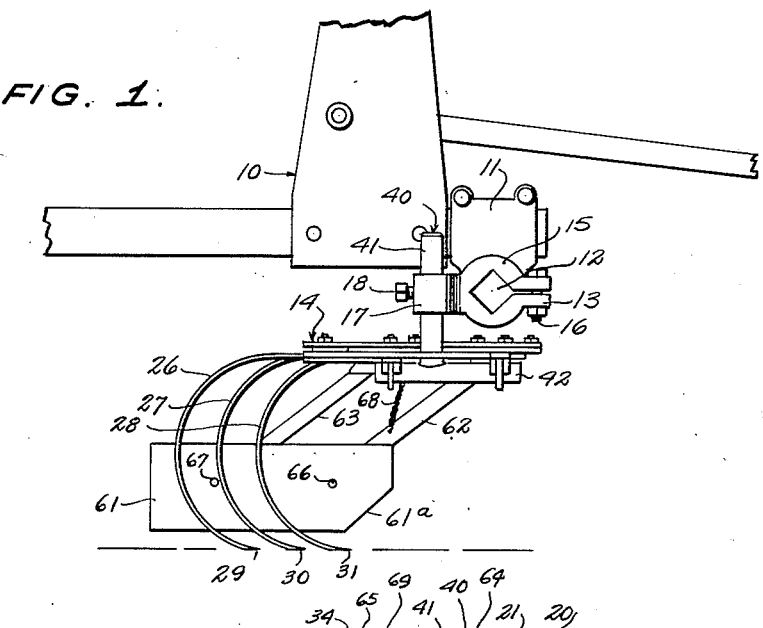
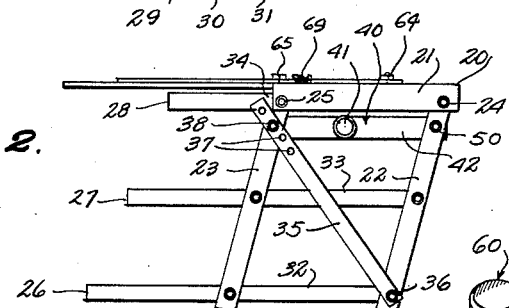
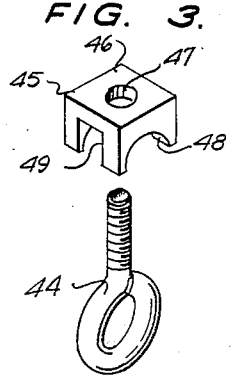
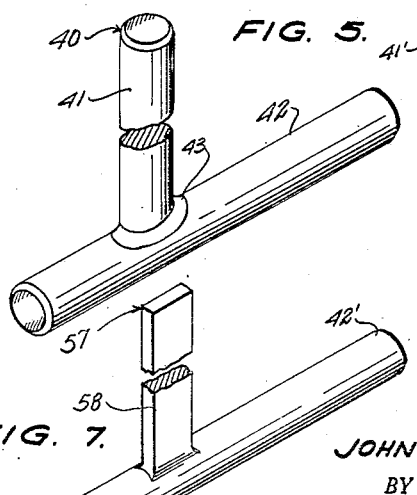
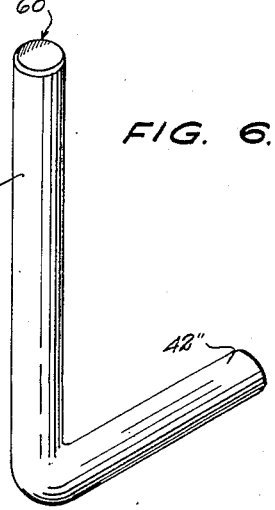
INVENTOR.
JOHN F. COCKERHAM,
BY
McMorrow, Berman & Davidson
ATTORNEYS.

Patented June 29, 1954

2,682,214

UNITED STATES PATENT OFFICE 2,682,214

HARROW ATTACHMENT FOR TRACTORS

John F. Cockerham, Hamilton, Miss.

Application August 5, 1949, Serial No. 108,766

1 Claim. (Cl. 97—175)

This invention relates to harrow attachments for tractors, and more particularly to improved attachments of the character disclosed in my prior application, Serial No. 620,473, filed October 5, 1945, for Harrow or Scratcher, and my application, Serial No. 773,011, filed September 9, 1947, for Harrow, both of such applications now abandoned.

It is among the objects of the present invention to provide an improved harrow attachment including improved means for floatingly supporting a plant fender for vertical movement relative to the supporting tractor, which attachment is of simplified and durable construction, is fully adjustable and extremely rigid and strong, which permits the fender to freely ride over stones, roots or other obstructions without damage and without lifting the remainder of the attachment, and which provides an improved connection between the harrow attachment and the attachment-supporting tractor.

Other objects and advantages will become apparent from a consideration of the following description and the appended claim in conjunction with the accompanying drawing, wherein:

Figure 1 is a side elevation of the harrow attachment and a fragmentary portion of a supporting tractor to which the attachment is operatively connected;

Figure 2 is a top plan view of the attachment illustrated in Figure 1;

Figure 3 is a perspective view of a special washer constituting a component of the means for connecting the attachment to the tractor;

Figure 4 is a perspective view of a ring bolt also constituting a component of the means for connecting the attachment to the tractor;

Figure 5 is a perspective view of a standard constituting another component of the means for connecting the attachment to the tractor;

Figure 6 is a perspective view of a somewhat modified form of standard; and

Figure 7 is a perspective view of a still further modified form of standard.

With continued reference to the drawing, the tractor frame, generally indicated at 10, has secured thereon a pair of transversely, spaced-apart clamps 11 which carry a transversely-extending plow shaft 12 of rectangular, cross-sectional shape. A pair of brackets 13 is mounted on the shaft 12 at respectively opposite sides of the tractor, and the harrow attachments, generally indicated at 14, are connected to the tractor by means of the brackets 13, respectively.

The bracket 13 has a split clamp portion 15 which surrounds the plow shaft 12 and is clamped thereon by a clamp screw 16 extending through apertured lugs at the split end of the clamp portion, and a cylindrical portion 17 having a bore therethrough which is substantially vertically disposed when the bracket is operatively mounted on the plow shaft 12. This cylindrical portion 17 has a screw-threaded aperture therethrough and a set screw 18 is threaded through this aperture to engage a standard by means of which an attachment 14 is connected to the tractor.

As the two attachments are identical in construction, except that one is right-hand and the other left-hand, only one such attachment has been illustrated in the accompanying drawing, the right-hand attachment having been selected for the purposes of illustration.

The attachment includes a frame 20 comprising a bar 21 of angle iron so disposed that one of its flanges is in a substantially horizontal plane, and its other flange is vertically disposed at the inner side of the frame when the attachment is operatively connected to a tractor, as illustrated in Figure 1. Two flat links 22 and 23 are pivotally connected, each at one end to the bar 21 at respectively opposite ends of the bar and extend outwardly from the bar to the outer side of the frame. These links are connected to the bar by suitable means, such as the pivot bolts 24 and 25, respectively extending through the horizontal flange of the bar 21 and through the links 22 and 23, respectively, near the ends of such links adjacent the bar.

A plurality of resilient harrow teeth are connected to the links 22 and 23, three such teeth being illustrated in the accompanying drawing, as indicated at 26, 27 and 28, respectively. Each of these spring teeth comprises a substantially semi-circularly curved portion having at its lower end, when the tooth is operatively mounted, as indicated in Figure 1, a ground-working point, as indicated at 29, 30 and 31, respectively, and at its opposite end an elongated, substantially straight shank, as indicated at 32, 33 and 34, respectively, which shanks are substantially horizontal when the teeth are in operative position and are disposed in spaced-apart, substantially parallel relationship to each other. The shanks 32, 33 and 34 are pivotally connected at their outer ends to the front link 22 at locations spaced apart longitudinally of such link, and are connected adjacent their juncture with the respective curved portions of the teeth to the rear link 23 at locations spaced apart longitudinally of this rear link.

The spacing between the teeth 26, 27 and 28 can be varied by swinging the links rearwardly from a position in which they are substantially perpendicular to the bar 21. The angular relationship of the links 22 and 23 to the bar 21 is adjustably controlled by a diagonal brace 35 which is pivotally connected at one end to the link 22 near the outer end of such link and preferably by means of the pivot bolt 36 which connects the forward end of the shank 32 to the link 22 near the outer end of the latter. Near its opposite end the brace 35 is provided with a series of spaced-apart holes 37 by means of which the brace is adjustably connected to the rear link 23 near the inner end of such rear link by an eye bolt 38.

The frame 20 is connected to the tractor-carried bracket 15 by a suitable standard, such as is illustrated in three somewhat different forms in Figures 5, 6 and 7.

The standard illustrated in Figure 5, and generally indicated at 40, comprises an elongated post 41 of circular cross-section and of substantially uniform size from one end to the other, and an elongated foot 42 which is also of circular cross-section and of substantially uniform diameter from one end to the other, and which is secured at a location intermediate its length to the normally lower end of the post 41 by suitable means, such as the weld 43, and is disposed substantially perpendicular to the post. In connecting the attachment to the tractor by means of the standard 40, the post 41 is inserted through the cylindrical portion 17 of the tractor-carried bracket 15 and is secured in this cylindrical portion of the bracket by the set screw 18 at a location to provide the desired working depth of the teeth 26, 27 and 28. The foot 42 of the standard extends below the frame 20 and underlies, at its opposite ends, the links 22 and 23, respectively, adjacent the ends of such links connected to the angle bar 21. Two ring bolts 44, as particularly illustrated in Figure 4, are placed around the foot 42, one near each end of the foot, and the screw-threaded shanks of these ring bolts are extended upwardly through apertures provided in the links 22 and 23 respectively. A washer 45, as particularly illustrated in Figure 3, surrounds each ring bolt and is interposed between the standard foot 42 and the corresponding link 22 or 23. Each of the washers 45 is rectangular in shape and has a flat, upper end 46 provided with a central aperture 47 through which the shank of the associated ring bolt 44 extends. In its lower end the washer is provided with a semi-cylindrical recess 48 which receives the upper portion of the foot 42 of the standard near the corresponding end of the foot, and is also provided with a rectangular recess 49 extending transversely to the semi-cylindrical recess 48 substantially at the mid-length location of the recess 48 to receive the ring portion of the associated ring bolt.

In assembling the device, the ring bolts are placed around the foot 42 of the standard near respectively opposite ends of the foot, two washers 45 are disposed on the foot near respectively opposite ends of the foot with the aperture 47 of each washer receiving the shank of the respective ring bolt, and the recess 49 of each washer receiving the ring portion of the ring bolt, and the recess 48 of each washer receiving the upper portion of the foot. The screw-threaded shanks of the ring bolts are then projected upwardly through apertures in the links 22 and 23, respectively, and nuts are threaded down on the shanks of the ring bolts to rigidly connect the foot of the standard to the frame 20 through the intermediacy of the links 22 and 23. In Figure 2 the rear ring bolt is indicated at 38, and the forward ring bolt is indicated at 50.

The standard illustrated in Figure 7, and generally indicated at 57, is similar in size and shape to the standard 40 and has a foot 42' similar in all respects to the foot 42 of the standard 40. The post 58 of the standard 57, however, has a rectangular instead of a circular cross-sectional shape, so that it may be slidably received in a tractor-carried bracket having a rectangular rather than a cylindrical opening in its cylindrical lug 17. In attaching both of the standards 40 and 57 to the frame of the attachment, the post will be disposed between the links 22 and 23.

The standard illustrated in Figure 6, and generally indicated at 60, is somewhat different in shape from the standards 40 and 57 in that the post is secured at its lower end to the foot at one end of the foot rather than intermediate the length of the foot, as is the case of the standards 40 and 57. The standard 60 has a post 41' similar in size and shape to the post 41 of the standard 40, and has a foot 42'' which is similar in size and shape to the foot 42 of the standard 40 and the foot 42' of the standard 57, the difference in the standard 60 from the standard 40 being that the post is connected to one end of the foot rather than to a location intermediate the length of the foot, as explained above. When the standard 60 is attached to the frame of the attachment, the post 41' will be disposed to the rear of the rear link 23 rather than between the two links 22 and 23.

The fender 61 is a metal plate of elongated, rectangular shape operatively mounted so that its length is disposed longitudinally fore-and-aft of the attachment and its width is substantially vertical. This fender has its front, lower corner cut away along the diagonal line 61a and is disposed below the frame 20 in substantial vertical alignment with the vertically-disposed flange of the angle bar 21 and extends rearwardly of this angle bar.

Two spaced-apart, substantially parallel struts 62 and 63 connect the fender 61 to the bar 21 of the frame. Each of these struts is pivotally connected near its upper end to the vertically-disposed flange of the bar 21 at respective locations spaced apart longitudinally of the bar by suitable means, such as the pivot bolts 64 and 65, respectively. Near their lower ends, the two struts 62 and 63 are pivotally connected to the fender 61 at locations spaced apart longitudinally of the fender by suitable means, such as the pivot bolts 66 and 67, respectively. The two struts 62 and 63 incline downwardly and rearwardly from the bar 21 to the fender 61, so that the fender is free to swing up and down as it encounters obstructions as the associated attachment is moved over the ground by the supporting tractor.

Downward movement of the fender is limited by adjustable means comprising a chain 68 connected at one end to the strut 62 near the upper edge of the fender 61 and adjustably connected to the bar 21 by engaging a selected chain link with a hook 69 carried by the bar 21 and projecting from the bar inwardly of the frame.

The adjustable frame, the harrow teeth carried by the frame and the fender plate, per se, are fully disclosed in my co-pending application, Serial No. 773,011 (now abandoned), referred to above, and the present invention is concerned primarily with the improved means for floatingly supporting the fender 61 including the pivoted means connecting the fender to the frame and the improved means connecting the frame to the attachment-supporting bracket of the supporting tractor.

The invention may be embodied in other specific forms without departing from the spirit or essential characteristics thereof. The present embodiments are, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

In a tractor harrow attachment, a horizontally disposed frame, means for attaching said frame to a tractor in spaced relation to a ground surface, said frame comprising an angle iron extending in the direction of travel of said tractor and disposed so that one of its flanges lies in a horizontal plane and its other flange lies in a vertical plane, a pair of horizontally disposed links arranged in longitudinally spaced parallel relation position transversely of said angle iron and each having one end pivotally connected to said one flange lying in the horizontal plane, a diagonal brace having one end pivotally connected to the other end of one of said links and having the other end pivotally connected to the other of said links at a point spaced outwardly from said one end of said other link, said brace having a plurality of spaced holes arranged in spaced relation extending inwardly from the other end thereof for selectively pivoting different longitudinal portions of the other end of said brace to the other of said links whereby said links can be secured in different angulated relation to said angle iron, a plurality of parallel transversely spaced longitudinally extending harrow teeth pivoted to said links and extending parallel to said angle iron, said links being adjustable by virtue of said diagonal brace to give said harrow teeth different positions in which the harrow teeth are given desired transverse spacing from each other in a horizontal plane and with the teeth occupying corresponding selected rearward, forward, and intermediate positions longitudinally of said angle iron, said attaching means comprising a standard securably engageable with the tractor to depend therefrom, a foot on the lower end of said standard and extending parallel to said angle iron, said foot being pivotally supported by ring bolts longitudinally of said angle iron and secured to the inner ends of and beneath said links alongside of said other flange of said angle iron lying in the vertical plane with said standard rising between said links.

References Cited in the file of this patent

UNITED STATES PATENTS

| Number | Name | Date |
|---|---|---|
| 302,144 | Jones | July 15, 1884 |
| 863,024 | Courtright | Aug. 13, 1907 |
| 1,690,525 | Best et al. | Nov. 6, 1928 |
| 1,939,958 | Dias | Dec. 19, 1933 |
| 2,146,338 | Huey | Feb. 7, 1939 |
| 2,413,467 | Patterson | Dec. 31, 1946 |
| 2,417,597 | Hill | Mar. 18, 1947 |